US009868106B2

(12) United States Patent
Sundara et al.

(10) Patent No.: US 9,868,106 B2
(45) Date of Patent: Jan. 16, 2018

(54) DIATOM-BASED NANOCOMPOSITES, METHODS FOR THEIR PREPARATION AND USE

(71) Applicant: Indian Institute of Technology Madras, Chennai (IN)

(72) Inventors: Ramaprabhu Sundara, Chennai (IN); Sangeetha Vellaichamy, Chennai (IN); Abinaya Shunmugam, Chennai (IN)

(73) Assignee: INDIAN INSTITUTE OF TECHNOLOGY MADRAS, Tamilnadu (IN)

( * ) Notice: Subject to any disclaimer, the term of this patent is extended or adjusted under 35 U.S.C. 154(b) by 0 days.

(21) Appl. No.: 14/742,444

(22) Filed: Jun. 17, 2015

(65) Prior Publication Data
US 2015/0367322 A1 Dec. 24, 2015

(30) Foreign Application Priority Data

Jun. 18, 2014 (IN) .......................... 2970/CHE/2014

(51) Int. Cl.
*B01J 20/28* (2006.01)
*B01J 20/04* (2006.01)
(Continued)

(52) U.S. Cl.
CPC ........... *B01J 20/20* (2013.01); *B01J 20/0225* (2013.01); *B01J 20/04* (2013.01); *B01J 20/14* (2013.01); *B01J 20/28076* (2013.01); *B01J 20/28083* (2013.01); *B01J 20/28085* (2013.01); *B01J 20/3078* (2013.01); *B01J 20/3085* (2013.01); *B01J 20/3204* (2013.01); *B01J 20/3236* (2013.01); *C01B 3/001* (2013.01);
(Continued)

(58) Field of Classification Search
CPC .. B01J 20/14; B01J 20/28076; B01J 20/3236; B01J 20/20; B01J 20/28083; B01J 20/3204; B01J 20/0225; B01J 20/3085; B01J 20/3078; B01J 20/04; B01J 20/28085; C01B 3/001; C01B 3/0084; H01M 8/04216; Y02E 60/324
See application file for complete search history.

(56) References Cited

U.S. PATENT DOCUMENTS 8,236,196 B1 * 8/2012 Fliermans ............. C01B 3/0015
252/188.21
2012/0228555 A1 * 9/2012 Cheng .................... B82Y 30/00
252/503

OTHER PUBLICATIONS

Losic et al. "Pore Architecture of Diatom Frustules: Potential Nanostructured Membranes for Molecular and Particle Separations", 2006, Journal of Nanoscience and nanotechnology, vol. 6 p. 982-989.*

(Continued)

*Primary Examiner* — Anthony J Zimmer
*Assistant Examiner* — Syed Iqbal
(74) *Attorney, Agent, or Firm* — Turk IP Law, LLC

(57) ABSTRACT

Methods of forming a diatom-based nanocomposite are provided. The methods include mixing at least one diatomic material, one or more metal precursors, and functionalized graphite oxide to form a mixture. The methods also include exfoliating the mixture in presence of hydrogen to reduce functionalized graphite oxide to graphene and reducing the one or more metal precursors to metal nanoparticles. The methods further include depositing the metal nanoparticles on the diatomic material to form the diatom-based nanocomposite.

13 Claims, 3 Drawing Sheets

(51) Int. Cl.

| | |
|---|---|
| C01B 3/00 | (2006.01) |
| B01J 20/20 | (2006.01) |
| B01J 20/14 | (2006.01) |
| B01J 20/02 | (2006.01) |
| B01J 20/32 | (2006.01) |
| B01J 20/30 | (2006.01) |
| H01M 8/04082 | (2016.01) |

(52) U.S. Cl.
CPC ....... *C01B 3/0084* (2013.01); *H01M 8/04216* (2013.01); *Y02E 60/324* (2013.01)

(56) References Cited

OTHER PUBLICATIONS

Bhagavathi et al. "Effect of nitrogen Doping on Hydrogen storage capacity of Palladium decorated Graphene" 2012, Longmuir 28, p. 7826-7833.*

Adams, B.D., et al., "High-Performance Pd-Based Hydrogen Spillover Catalysts for Hydrogen Storage," The Journal of Physical Chemistry C, vol. 114, Issue 46, pp. 19875-19882 (Nov. 3, 2010).

Chen, H., and Yang, R.T., "Catalytic effects of TiF3 on hydrogen spillover on Pt/carbon for hydrogen storage," Langmuir, vol. 26, Issue 19, pp. 15394-15398 (Oct. 5, 2010).

Jeffryes, C., et al., "The potential of diatom nanobiotechnology for applications in solar cells, batteries, and electroluminescent devices," Energy & Environmental Science, vol. 4, Issue 10, pp. 3930-3941 (Aug. 2011).

Lachawiec, A. J., et al., "Hydrogen Storage in Nanostructured Carbons by Spillover: Bridge-Building Enhancement," Langmuir, vol. 21, Issue 24, pp. 11418-11424 (Nov. 22, 2005).

Panayotov, D.A., Jr. Yates, J.T., "Spectroscopic Detection of Hydrogen Atom Spillover from Au Nanoparticles Supported on TiO2: Use of Conduction Band Electrons," The Journal of Physical Chemistry C, vol. 111, Issue 7, pp. 2959-2964 (Jan. 26, 2007).

Parambhath, V.B., et al., "Effect of Nitrogen Doping on Hydrogen Storage Capacity of Palladium Decorated Graphene," Langmuir, vol. 28, Issue 20, pp. 7826-7833 (May 1, 2012).

Saha, D., and Deng, S., "Hydrogen adsorption on ordered mesoporous carbons doped with Pd, Pt, Ni, and Ru," Langmuir, vol. 25, Issue 21, pp. 12550-12560 (Nov. 3, 2009).

Sheng, Z-H., et al., "Synthesis of boron doped graphene for oxygen reduction reaction in fuel cells", Journal of Materials Chemistry, vol. 22, Issue 2, pp. 390-395 (Sep. 2011).

* cited by examiner

DIATOM-BASED NANOCOMPOSITES, METHODS FOR THEIR PREPARATION AND USE

CROSS-REFERENCE TO RELATED APPLICATION

This application claims priority under 35 U.S.C. §119(a) of India Application No. 2970/CHE/2014 filed on Jun. 18, 2014. The India Application is hereby incorporated by reference in its entirety.

BACKGROUND

Hydrogen storage is important to a wide variety of applications such as fuel cells, portable power generation and hydrogen combustion engines. Typically, hydrogen ($H_2$) is stored in different forms such as in a compressed gaseous form, a liquid form, or a solid-state form. Transportation of high-pressure heavy weight gaseous hydrogen cylinders can have safety issues. Further, liquid hydrogen storage systems may be expensive and may have losses over a period of time due to evaporation or leakage of hydrogen. Additionally, hydrogen leaks can result in safety hazards.

Hydrogen storage in solid-state form can provide safe and efficient storage of hydrogen. Hydrogen can be stored in solid-state materials as physically bound hydrogen molecules or as chemically bound H atoms. A variety of carbon-based materials such as activated carbon, carbon nanofibers, carbon nanotubes (CNTs), and graphene have been explored for hydrogen storage applications. However, such carbon-based materials have relatively low hydrogen storage capacity at ambient temperatures and moderate pressures due to physical adsorption of hydrogen molecules.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming a diatom-based nanocomposite are provided. The methods include mixing at least one diatomic material, one or more metal precursors, and functionalized graphite oxide to form a mixture. The methods also include exfoliating the mixture in presence of hydrogen to reduce functionalized graphite oxide to graphene and reducing the one or more metal precursors to metal nanoparticles. The methods further include depositing the metal nanoparticles on the diatomic material to form the diatom-based nanocomposite.

In accordance with another aspect, methods of forming a diatom-based nanocomposite are provided. The methods include oxidizing graphite to form graphite oxide and sonicating graphite oxide in an acidic medium to form functionalized graphite oxide. The methods include mixing diatom frustules and precursor of at least one of palladium cobalt alloy ($Pd_3Co$) and magnesium nickel alloy ($Mg_2Ni$) with functionalized graphite oxide to form a mixture and exfoliating the mixture in presence of hydrogen to reduce functionalized graphite oxide to graphene. The methods further include reducing the precursor to at least one of palladium cobalt alloy ($Pd_3Co$) and magnesium nickel alloy ($Mg_2Ni$) nanoparticles and depositing the at least one of palladium cobalt alloy ($Pd_3Co$) and magnesium nickel alloy ($Mg_2Ni$) nanoparticles within pores of the diatom frustules to form the diatom-based nanocomposite.

In accordance with another aspect, diatom-based nanocomposites are provided. The diatom-based nanocomposites include graphene, a diatomic material, and a plurality of metal nanoparticles. The plurality of metal nanoparticles are embedded in one or more pores of the diatomic material.

In accordance with another aspect, hydrogen storage materials are provided. The hydrogen storage materials include graphene, diatom frustules, and at least one of palladium cobalt alloy ($Pd_3Co$) and magnesium nickel alloy ($Mg_2Ni$) nanoparticles. The nanoparticles are embedded in one or more pores of the diatom frustules.

In accordance with another aspect, methods of storing hydrogen are provided. The methods include providing a hydrogen storage material. The hydrogen storage material includes graphene, diatom frustules, and at least one of palladium cobalt alloy ($Pd_3Co$) and magnesium nickel alloy ($Mg_2Ni$) nanoparticles embedded in one or more pores of the diatom frustules. The method also includes activating the one or more pores to form a plurality of adsorption sites.

DETAILED DESCRIPTION

Figure 1:
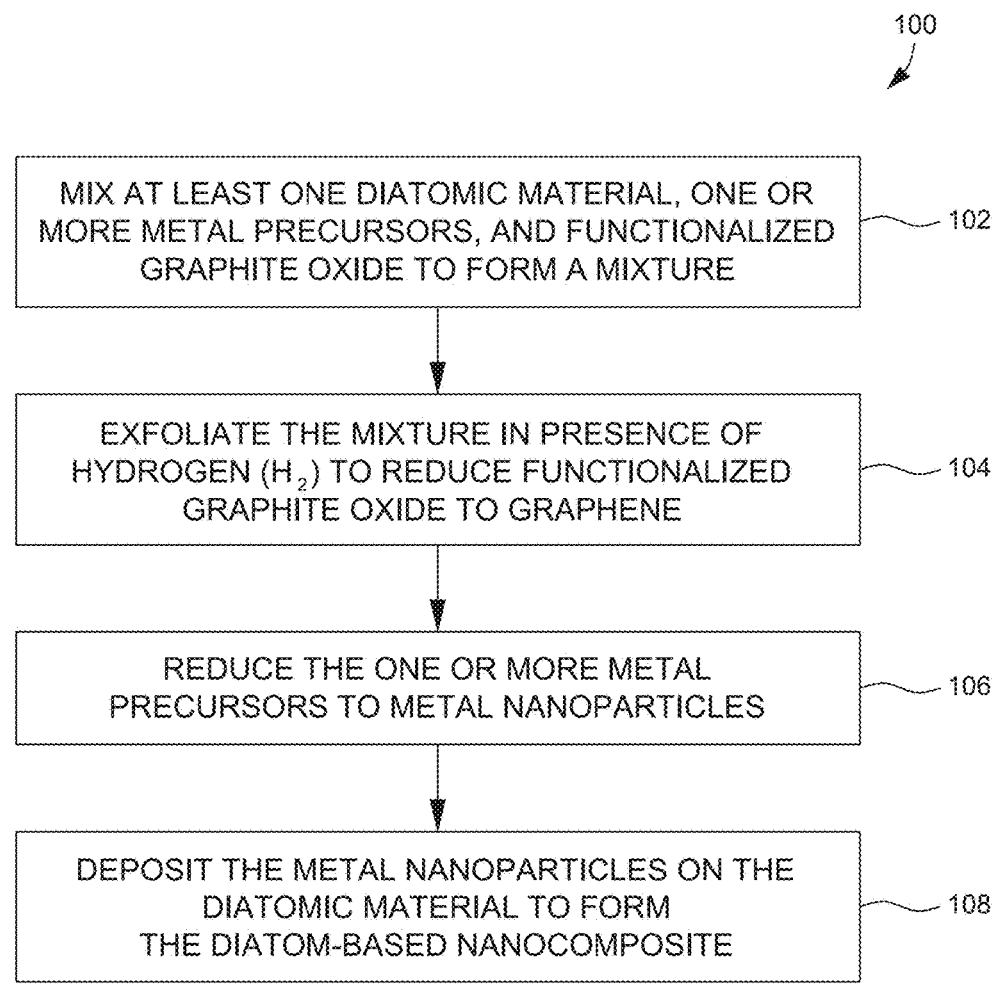
FIG. 1 is an example flow diagram of an embodiment of a method of forming a diatom-based nanocomposite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to techniques of forming diatom-based nanocomposites. The present technique provides methods of forming diatom-based nanocomposites by exfoliation and reduction of functionalized graphite oxide (f-GO) in the presence of at least one diatomic material and one or more metal precursors. The techniques are environment friendly and are substantially cost effective. The present techniques facilitate formation of diatom-based nanocomposites that are lightweight and have substantially large surface areas. Such diatom-based nanocomposites may be used as hydrogen storage materials.

Referring now to FIG. 1, an example flow diagram 100 of an embodiment of a method of forming a diatom-based nanocomposite is illustrated. At block 102, at least one diatomic material, one or more metal precursors, and functionalized graphite oxide are mixed to form a mixture. In one example, the diatomic material includes diatomaceous earth. Examples of the one or more metal precursors include, but are not limited to, platinum chloride ($PtCl_2$), palladium chloride ($PdCl_2$), magnesium chloride ($MgCl_2$), nickel chloride ($NiCl_2$), ferrous chloride ($FeCl_2$), cobalt chloride ($CoCl_2$), or combinations thereof.

In one example, graphite is oxidized to form graphite oxide and the graphite oxide is sonicated in an acidic medium to form the functionalized graphite oxide. Examples of the acidic medium include, but are not limited to, sulfuric acid ($H_2SO_4$), nitric acid ($HNO_3$), or combinations thereof.

At block 104, the mixture is exfoliated in presence of hydrogen ($H_2$) to reduce functionalized graphite oxide to graphene. The exfoliation of the mixture may generally be performed at any temperature and for any length of time. In one example, the exfoliation of the mixture is performed at an elevated temperature, such as a temperature of about 500° C. to about 700° C. Specific examples of the exfoliation temperature include, about 500° C., about 550° C., about 600° C., about 650° C., about 700° C., and ranges between any two of these values (including endpoints).

At block 106, the one or more metal precursors are reduced to metal nanoparticles. Examples of the metal nanoparticles include, but are not limited to, platinum (Pt), palladium (Pd), nickel (Ni), magnesium (Mg), cobalt (Co), platinum cobalt alloy ($Pt_3Co$), platinum nickel alloy ($Pt_3Ni$), palladium cobalt alloy ($Pd_3Co$), palladium nickel alloy ($Pd_3Ni$), magnesium nickel alloy ($Mg_2Ni$), palladium iron alloy ($Pd_3Fe$), platinum iron alloy ($Pt_3Fe$), or combinations thereof. At block 108, the metal nanoparticles are deposited on the diatomic material to form the diatom-based nanocomposite.

In one embodiment, a method of forming a diatom-based nanocomposite with metal alloy nanoparticles is provided. In this embodiment, graphite is oxidized to form graphite oxide. Further, the graphite oxide is sonicated in an acidic medium to form functionalized graphite oxide. Examples of the acidic medium include, but are not limited to, sulfuric acid ($H_2SO_4$), nitric acid ($HNO_3$), or combinations thereof. Further, diatom frustules and precursor of at least one of palladium cobalt alloy ($Pd_3Co$) and magnesium nickel alloy ($Mg_2Ni$) are mixed with the functionalized graphite oxide to form a mixture and the mixture is exfoliated in presence of hydrogen to reduce the functionalized graphite oxide to graphene. Examples of the precursors include, but are not limited to, palladium chloride ($PdCl_2$), magnesium chloride ($MgCl_2$), nickel chloride ($NiCl_2$), ferrous chloride ($FeCl_2$), cobalt chloride ($CoCl_2$) or combinations thereof.

Here, the precursors are reduced to at least one of palladium cobalt alloy ($Pd_3Co$) and magnesium nickel alloy ($Mg_2Ni$) nanoparticles and the at least one of palladium cobalt alloy ($Pd_3Co$) and magnesium nickel alloy ($Mg_2Ni$) nanoparticles are deposited within pores of the diatom frustules to form the diatom-based nanocomposite.

In certain embodiments, diatom-based nanocomposites are formed using the process of FIG. 1. As discussed above, the diatom-based nanocomposites include graphene, a diatomic material and a plurality of metal nanoparticles. In one example, the diatomic material includes diatomaceous earth. In one example, the diatomic material can be present in the nanocomposite at various concentrations, such as a concentration of about 20 wt % to about 50 wt %. Specific examples of the concentration of the diatomic material include, about 20 wt %, about 25 wt %, about 30 wt %, about 35 wt %, about 40 wt %, about 45 wt %, about 50 wt %, and ranges between any two of these values (including endpoints).

In one example, the diatomic material has an average pore size of about 25 nanometers (nm) to about 60 nm. Specific examples of the pore size include, about 25 nm, about 30 nm, about 35 nm, about 40 nm, about 45 nm, about 50 nm, about 55 nm, about 60 nm, and ranges between any two of these values (including endpoints). In one example, the diatomic material has an average pore volume of about 1.4 cubic centimeters per gram ($cm^3/g$) to about 1.5 $cm^3/g$. Specific examples of the pore volume include, about 1.4 $cm^3/g$, about 1.41 $cm^3/g$, about 1.42 $cm^3/g$, about 1.43 $cm^3/g$, about 1.44 $cm^3/g$, about 1.45 $cm^3/g$, about 1.46 $cm^3/g$, about 1.47 $cm^3/g$, about 1.48 $cm^3/g$, about 1.49 $cm^3/g$, about 1.5 $cm^3/g$, and ranges between any two of these values (including endpoints).

In some examples, the plurality of metal nanoparticles are reduced from one or more metal precursors, and are embedded in one or more pores of the diatomic material. Examples of the one or more metal precursors include, but are not limited to, platinum chloride ($PtCl_2$), palladium chloride ($PdCl_2$), magnesium chloride ($MgCl_2$), nickel chloride ($NiCl_2$), ferrous chloride ($FeCl_2$), cobalt chloride ($CoCl_2$) or combinations thereof.

In one example, the one or more metal precursors can be present at various concentrations, such as a concentration of about 15 weight percentage (wt %) to about 25 wt %. Specific examples of the one or more metal precursors concentration include, about 15 wt %, about 17 wt %, about 19 wt %, about 21 wt %, about 23 wt %, about 25 wt %, and ranges between any two of these values (including endpoints).

Examples of the metal nanoparticles include, but are not limited to, platinum (Pt), palladium (Pd), nickel (Ni), magnesium (Mg), cobalt (Co), platinum cobalt alloy ($Pt_3Co$), platinum nickel alloy ($Pt_3Ni$), palladium cobalt alloy ($Pd_3Co$), palladium nickel alloy ($Pd_3Ni$), magnesium nickel alloy ($Mg_2Ni$), palladium iron alloy ($Pd_3Fe$), platinum iron alloy ($Pt_3Fe$) or combinations thereof.

In some examples, the metal nanoparticles can be present in the nanocomposite at various concentrations, such as a concentration of about 15 wt % to about 25 wt %. Specific examples of the metal nanoparticles concentration include, about 15 wt %, about 17 wt %, about 19 wt %, about 21 wt %, about 23 wt %, about 25 wt %, and ranges between any two of these values (including endpoints).

The diatom-based nanocomposites described above are configured to store hydrogen in the one or more pores of the nanocomposite. Such nanocomposites can be used as hydrogen storage materials. In one example, the hydrogen storage material includes graphene, diatom frustules, and at least one of palladium cobalt alloy ($Pd_3Co$) and magnesium nickel alloy ($Mg_2Ni$) nanoparticles. The palladium cobalt alloy ($Pd_3Co$) or magnesium nickel alloy ($Mg_2Ni$) nanoparticles are embedded in one or more pores of the diatom frustules.

In this example, the hydrogen storage material is configured to store hydrogen in the one or more pores of the diatom frustules. In one example, the $Pd_3Co$ nanoparticles are present in the hydrogen storage material at various concentrations, such as a concentration of about 15 wt % to about 25 wt %. Specific examples of the $Pd_3Co$ nanoparticles concentration include, about 15 wt %, about 16 wt %, about 17 wt %, about 18 wt %, about 19 wt %, about 20 wt %, about 21 wt %, about 22 wt %, about 23 wt %, about 24 wt %, about 25 wt %, and ranges between any two of these values (including endpoints).

In another example, the magnesium nickel alloy ($Mg_2Ni$) nanoparticles are present in the hydrogen storage material at various concentrations, such as a concentration of about 15 wt % to about 25 wt %. Specific examples of the $Mg_2Ni$ nanoparticles concentration include, about 15 wt %, about 16 wt %, about 17 wt %, about 18 wt %, about 19 wt %, about 20 wt %, about 21 wt %, about 22 wt %, about 23 wt %, about 24 wt %, about 25 wt %, and ranges between any two of these values (including endpoints).

In one example, the hydrogen storage material has a gravimetric hydrogen storage capacity of about 2.5 wt % to about 6.5 wt %. Specific examples of the gravimetric hydrogen storage capacity include, about 2.5 wt %, about 3.5 wt %, about 4.5 wt %, about 5.5 wt %, about 6.5 wt %, and ranges between any two of these values (including endpoints).

Figure 2:
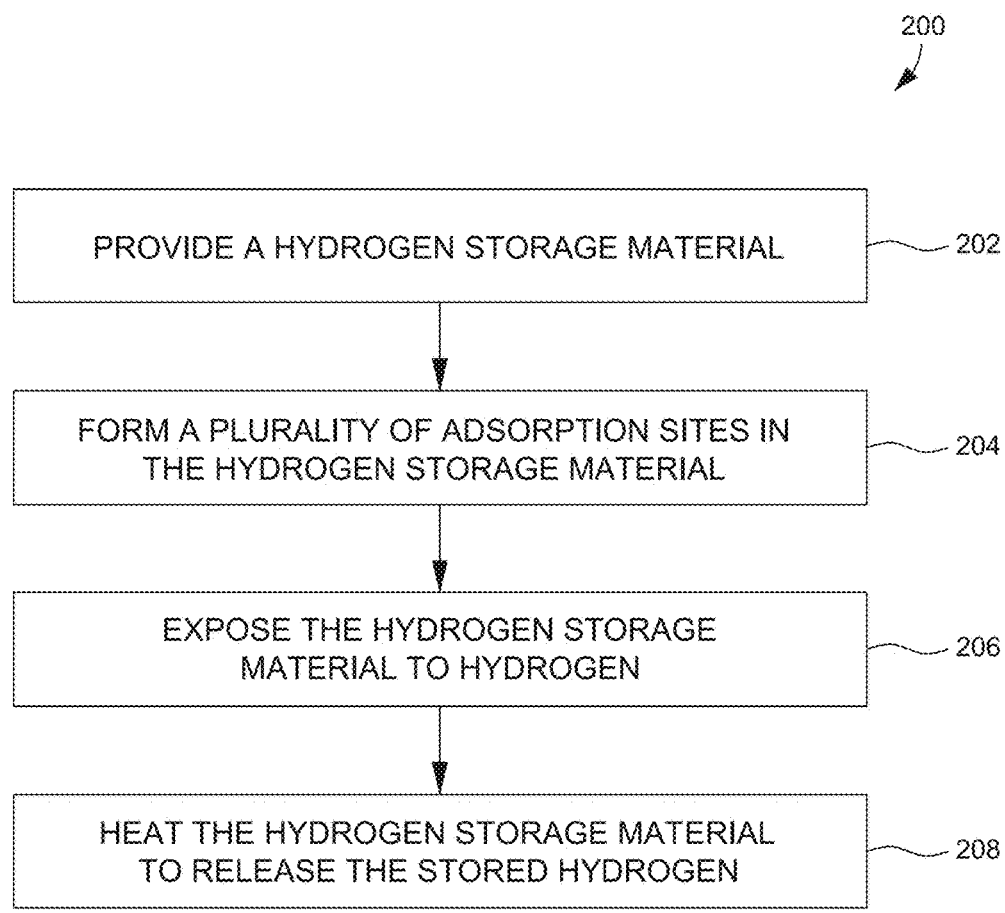
FIG. 2 is an example flow diagram of an embodiment of a method of storing hydrogen.

Referring now to FIG. 2, an example flow diagram 200 of an embodiment of a method of storing hydrogen is illustrated. At block 202, a hydrogen storage material is provided. The hydrogen storage material includes graphene, diatom frustules, and at least one of palladium cobalt alloy ($Pd_3Co$) and magnesium nickel alloy ($Mg_2Ni$) nanoparticles embedded in one or more pores of the diatom frustules.

At block 204, a plurality of adsorption sites are formed in the hydrogen storage material. In this embodiment, the one or more pores of the diatom frustules are activated to form the plurality of adsorption sites. In one embodiment, the hydrogen storage material is heated to remove dissolved gases and the material is subsequently cooled to a desired temperature.

In one example, heating of the hydrogen storage material is performed at an elevated temperature, such as a temperature of about 350° C. to about 400° C. Specific examples of the heating temperature include, about 350° C., about 360° C., about 370° C., about 380° C., about 390° C., about 400° C., and ranges between any two of these values (including endpoints). In another example, heating of the hydrogen storage material is performed at a pressure of $10^{-5}$ milli bars (mbar) to about $10^{-6}$ mbar.

In one example, heating of the hydrogen storage material is performed for a time period of about 2 hours to about 3 hours. Specific examples of the heating time period include, about 2 hours, about 2.1 hours, about 2.2 hours, about 2.3 hours, about 2.4 hours, about 2.5 hours, about 2.6 hours, about 2.7 hours, about 2.8 hours, about 2.9 hours, about 3 hours, and ranges between any two of these values (including endpoints). In some examples, heating can be performed for less than about 2 hours or for more than about 3 hours.

In one example, cooling of the hydrogen storage material is performed an elevated temperature, such as a temperature of about 25° C. to about 100° C. Specific examples of the cooling temperature include, about 25° C., about 50° C., about 75° C., about 100° C., and ranges between any two of these values (including endpoints). At block 206, the hydrogen storage material is exposed to hydrogen to store hydrogen in the plurality of adsorption sites. Further, the hydrogen storage material is heated to release the stored hydrogen from the adsorption sites to reload the adsorption sites with hydrogen.

EXAMPLES

The present invention will be described below in further detail with examples and comparative examples thereof, but it is noted that the present invention is by no means intended to be limited to these examples.

Example 1: Synthesis of a Diatom-Based Nanocomposite

A diatom-based nanocomposite was synthesized using the example process of FIG. 1. Graphite oxide was synthesized using Hummer's technique. Here, about 2 grams (gm) of graphite was added to about 46 milliliter (ml) of concentrated sulfuric acid ($H_2SO_4$) with continuous stirring in an ice bath to prepare a mixture. Subsequently, about 1 gm of sodium nitrate ($NaNO_3$) and about 6 gm of potassium permanganate ($KMnO_4$) were added to the above mixture. The ice bath was then removed and the temperature of the mixture was maintained at room temperature.

Next, about 92 ml water was added to the mixture. After a time period of about 15 minutes, the above mixture was diluted with warm water and the concentration of the mixture was maintained to be about 280 ml. Further, about 3 wt % of hydrogen peroxide ($H_2O_2$) was added to the mixture until the color of the mixture turned to bright yellow. The mixture was then filtered and the filtration residue was repeatedly washed with warm water. The filtration residue was diluted with water and the resulting suspension was centrifuged. Further, the suspension was dried in vacuum at a temperature of about 50° C. to form graphite oxide (GO) and was stored in a vacuum desiccator.

The graphite oxide (GO) was functionalized with concentrated sulfuric acid ($H_2SO_4$) and nitric acid ($HNO_3$). The ratio of concentration of $H_2SO_4$ and $HNO_3$ was maintained at about 3:1. Here, about 475 mg of GO was ultrasonicated in presence of about 20 ml of $H_2SO_4$ and $HNO_3$ for a time period of about 3 hours. The pH of the solution was maintained at about 7 by adding about 1 molar (M) of sodium hydroxide (NaOH) solution. The mixture was filtered, washed and dried under vacuum to form functionalized graphite oxide.

The functionalized graphite oxide was mixed with diatom frustules and metal precursors to form a mixture. The mixture was exfoliated in presence of hydrogen at a temperature of about 500° C. to form diatom-based nanocomposites. The amount of functionalized graphite oxide used for the reaction was about 400 milligram (mg) and the amount of diatom frustule was varied from about 50 mg to about 150 mg. Various samples were prepared with different ratios of diatom frustules and graphite oxide. Further, the concentration of metal precursors was about 20 wt % to about 25 wt %. For some samples, the metal precursor used was Pd—Co alloy having a concentration ratio of about 3:1. For some other samples, the metal precursor used was Mg—Ni having a concentration ratio of about 2:1.

Example 2: Characterization of Diatom-Based Nanocomposites

Figure 3:
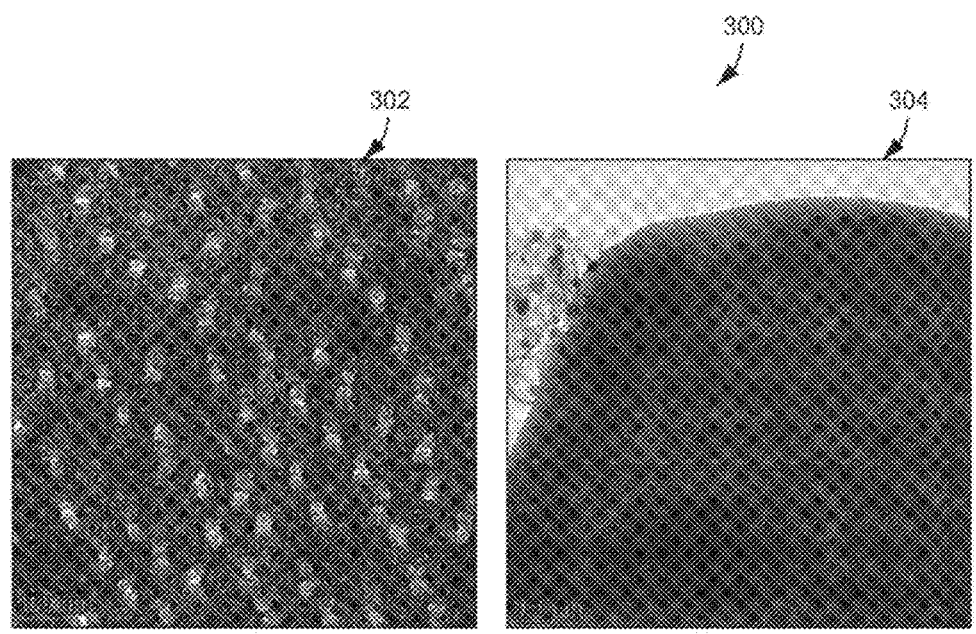
FIG. 3 illustrates example transmission electron microscopy (TEM) images of a diatom frustule and a diatom-based nanocomposite.

FIG. 3 illustrates example transmission electron microscopy (TEM) images 300 of diatom frustule and a diatom-based nanocomposite of Example 1. The diatom-based nanocomposite was formed using metal precursor of palladium-cobalt alloy ($Pd_3Co$). The TEM image of the diatom frustule is represented by reference numeral 302 and the TEM image of the diatom-based nanocomposite is represented by reference numeral 304. As can be seen from the images 302 and 304, palladium-cobalt alloy ($Pd_3Co$) nanoparticles were observed to be embedded within pores of the diatom frustules.

The pressure-composition (PC) isotherms for the above samples were obtained. Initially, each sample was placed inside a chamber and was flushed with hydrogen for several cycles. Further, the sample was activated by vacuum heat treatment before exposing it to hydrogen to form new active adsorption sites. The samples were activated by heating the sample to a temperature of about 350° C. at a pressure of about $1\times10^{-6}$ milli bar (mbar) for a time period of about 2 hours in order to remove any dissolved gases that may be present in the sample. Further, the sample was cooled to a desired temperature prior to exposure of the sample to hydrogen. The PC isotherm was determined in accordance with the following relationship:

$$abn_i^3 - aV_i n_i^2 + (RT+P_i b)V_i^2 n_i - P_i V_i^3 = 0 \quad (1)$$

where, $n_i$ is moles of hydrogen gas
$P_i$ is initial pressure
$V_i$ is the initial volume
a is a constant (for hydrogen, $a = 2.45\times10^{-2}$ Pascal. $m^3$)
b is a constant (for hydrogen, $b = 26.61\times10^{-6}$ $m^3$/moles)
R is a gas constant (8.31446 Joule/moles Kelvin)
T is temperature in Kelvin (K)

Once the reaction was completed, the equilibrium pressure $P_{eq}$ was determined. Here, n' moles of hydrogen were present in volume $V_i$ and n" moles of hydrogen in the volume $V_a$. The corresponding PC isotherms are represented in accordance with the following relationships:

$$abn'^3 - aV_i n'^2 + (RT+P_{eq} b)V_i^2 n' - P_{eq} V_i^3 = 0 \quad (2)$$

$$abn''^3 - aV_a n''^2 + (RT+P_{eq} b)V_a^2 n'' - P_{eq} V_a^3 = 0 \quad (3)$$

The number of moles ($\Delta n$) of hydrogen absorbed by m gram of the sample is, determined in accordance, with the following relationship:

$$\Delta n = n_i - (n'+n'') \quad (4)$$

Further, the hydrogen weight percentage (wt %) at equilibrium hydrogen pressure $P_{eq}$ in the sample was estimated in accordance with the following relationship:

$$\text{wt \%} = 2 \times \frac{\Delta n}{m} \times 100 \quad (5)$$

Upon completion of the loading cycle of the sample, the sample was heated again under vacuum to release the stored hydrogen and the sample was available for the next loading cycle.

Figure 4:
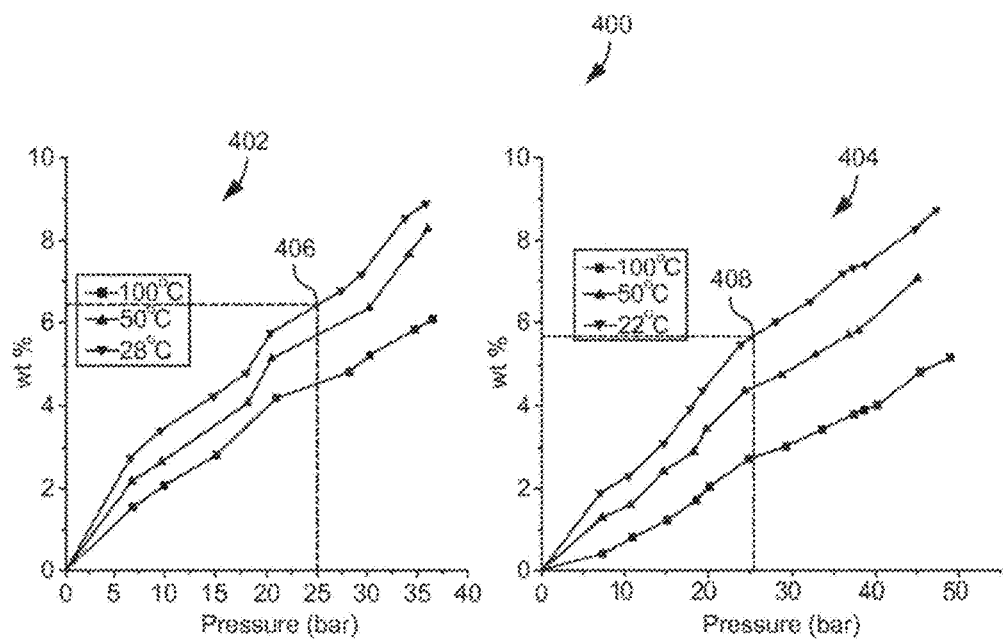
FIG. 4 illustrates example hydrogen adsorption isotherms for a diatom-based nanocomposite.

FIG. 4 illustrates example hydrogen adsorption isotherms 400 for the diatom-based nanocomposite of Example 1. The hydrogen adsorption isotherm plots 400 were obtained at a pressure in the range of about 1 bar to about 50 bar and at a temperature in the range of about 25° C. to about 100° C. The hydrogen adsorption isotherm for a diatom-based nanocomposite with Pd—Co alloy ($Pd_3Co$) nanoparticles is represented by reference numeral 402. The hydrogen adsorption isotherms plot for a diatom-based nanocomposite with Mg—Ni alloy ($Mg_2Ni$) nanoparticles is represented by reference numeral 404. As can be seen, the hydrogen storage for the diatom-based nanocomposite with $Pd_3Co$ nanoparticles measured at room temperature and at a pressure of about 25 bar was about 6.5 wt % (represented by reference numeral 406).

Further, the hydrogen storage for the diatom-based nanocomposite with $Mg_2Ni$ nanoparticles measured at room temperature and at pressure of about 25 bar was about 5.7 wt % (represented by reference numeral 408). The hydrogen storage capacity obtained for the diatom-based nanocomposites described above was observed to be substantially higher than other hydrogen storage materials such as nitrogen doped graphene with palladium nanoparticles having a storage capacity of about 4 wt %. Moreover, the hydrogen storage capacity of the diatom-based nanocomposites is substantially higher than the specified target (5.5 wt %) by U.S. Department of Energy (DoE).

The present techniques provide diatom-based nanocomposites including graphene, a diatomic material and metal nanoparticles. The diatom-based nanocomposites are formed by hydrogen exfoliation of functionalized graphite oxide in presence of frustule and metal precursors. The diatom-based nanocomposites formed using the techniques described above have substantially high gravimetric hydrogen storage capacity. The present technique is simple and cost effective.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A diatom-based nanocomposite comprising graphene, at least one diatomic material, and a plurality of metal nanoparticles, wherein the plurality of metal nanoparticles are embedded in one or more pores of the at least one diatomic material; and wherein the plurality of metal nanoparticles are reduced from one or more metal precursors.

2. The diatom-based nanocomposite of claim 1, wherein the one or more metal precursors comprise platinum chloride ($PtCl_2$), palladium chloride ($PdCl_2$), magnesium chloride ($MgCl_2$), nickel chloride ($NiCl_2$), ferrous chloride ($FeCl_2$), cobalt chloride ($CoCl_2$), or combinations thereof.

3. The diatom-based nanocomposite of claim 2, wherein the one or more metal precursors are present at a concentration of about 15 weight percentage (wt %) to about 25 wt %.

4. The diatom-based nanocomposite of claim 1, wherein the metal nanoparticles comprise platinum (Pt), palladium (Pd), nickel (Ni), magnesium (Mg), cobalt (Co), platinum cobalt alloy ($Pt_3$—Co), platinum nickel alloy ($Pt_3Ni$), palladium cobalt alloy ($Pd_3Co$), palladium nickel alloy ($Pd_3Ni$), magnesium nickel alloy ($Mg_2Ni$), palladium iron alloy ($Pd_3Fe$), platinum iron alloy ($Pt_3Fe$), or combinations thereof.

5. The diatom-based nanocomposite of claim 1, wherein the at least one diatomic material comprises diatomaceous earth.

6. The diatom-based nanocomposite of claim 1, wherein the at least one diatomic material is present in the nanocomposite at a concentration of about 20 wt % to about 50 wt %.

7. The diatom-based nanocomposite of claim 6, wherein the at least one diatomic material has an average pore size of about 25 nanometers (nm) to about 60 nm.

8. The diatom-based nanocomposite of claim 6, wherein the at least one diatomic material has an average pore volume of about 1.4 cubic centimeters per gram ($cm^3/g$) to about 1.5 $cm^3/g$.

9. The diatom-based nanocomposite of claim 1, wherein the plurality of metal nanoparticles are present in the diatom-based nanocomposite at a concentration of about 15 wt % to about 25 wt %.

10. The diatom-based nanocomposite of claim 1, wherein the diatom-based nanocomposite is configured to store hydrogen in one or more pores of the diatom-based nanocomposite.

11. The diatom-based nanocomposite of claim 1, wherein the diatom-based nanocomposite has a high gravimetric hydrogen storage capacity of about 2.5 wt % to about 6.5 wt %.

12. The diatom-based nanocomposite of claim 1, wherein the at least one diatomic material comprises diatom frustules.

13. The diatom-based nanocomposite of claim 12, wherein the plurality of metal nanoparticles are embedded in one or more pores of the diatom frustules.

* * * * *